US010352463B2

(12) United States Patent
Forrestal

(10) Patent No.: US 10,352,463 B2
(45) Date of Patent: Jul. 16, 2019

(54) WATER TEMPERATURE REGULATING VALVE

(71) Applicant: Reliance Worldwide Corporation (Aust.) Pty. Ltd., Eagle Farm, Queensland (AU)

(72) Inventor: David Peter Forrestal, Clayfield (AU)

(73) Assignee: Reliance Worldwide Corporation (Aust.) Pty. Ltd., Melbourne (AU)

( * ) Notice: Subject to any disclaimer, the term of this patent is extended or adjusted under 35 U.S.C. 154(b) by 120 days.

(21) Appl. No.: 14/774,069

(22) PCT Filed: Mar. 12, 2014

(86) PCT No.: PCT/AU2014/000244
§ 371 (c)(1),
(2) Date: Sep. 9, 2015

(87) PCT Pub. No.: WO2014/138786
PCT Pub. Date: Sep. 18, 2014

(65) Prior Publication Data
US 2016/0018010 A1 Jan. 21, 2016

(30) Foreign Application Priority Data

Mar. 12, 2013 (AU) ................................ 2013900844

(51) Int. Cl.
*G05D 23/13* (2006.01)
*G05D 23/02* (2006.01)
(Continued)

(52) U.S. Cl.
CPC ............ *F16K 11/07* (2013.01); *F16K 31/002* (2013.01); *G05D 23/02* (2013.01); *G05D 23/1346* (2013.01)

(58) Field of Classification Search
CPC .... F16K 11/07; F16K 31/002; F16K 11/0716; F16K 31/0613; F16K 31/122;
(Continued)

(56) References Cited

U.S. PATENT DOCUMENTS 3,001,717 A * 9/1961 Rimsha .............. G05D 23/1393
137/606
3,061,195 A * 10/1962 Bowman ............ G05D 23/1346
137/898

(Continued)

FOREIGN PATENT DOCUMENTS

DE 102006050825 A1 * 4/2008 ............. G05D 23/02
EP 0897082 A1 2/1999
(Continued)

OTHER PUBLICATIONS

International Search Report issued in PCT/AU2014/000244 dated Jul. 11, 2014, 4 pages.

(Continued)

*Primary Examiner* — Cassey D Bauer
*Assistant Examiner* — Miguel A Diaz
(74) *Attorney, Agent, or Firm* — Bush Intellectual Property Law; Kenneth M. Bush

(57) ABSTRACT

A water temperature regulating valve (10) including a valve body (12) having a cavity (13) in which mixing of fluids can occur, and provided with a hot fluid (or heated water) inlet (18) adapted for communication with a source of hot (or heated) water, a cooled fluid inlet (16) adapted for communication with an apparatus that has used the mixed fluid for heating, a mixed fluid outlet (14) adapted for communication with an apparatus that uses the mixed fluid for heating, and a return fluid outlet (20) adapted for communication with the source of hot (or heated) water, all inlets and outlets also being in communication with the cavity (13) provided (Continued)

within the valve body (12), said cavity (13) being provided with an insert (24) in a sealing relationship with an inner surface of the said cavity (13), said insert (24) having a central bore (42) and also defining flow passages and being configured to direct the flows of hot fluid entering the cavity (13) via the hot fluid inlet (18) and cooled fluid entering the cavity via the cooled fluid inlet (16), the flow passages defined by the said insert (24) interacting with moveable closure means to selectively permit, restrict or prevent the flows of hot fluid and cooled fluid into the cavity (13), and mixed fluid and return fluid out of the cavity (13), said moveable closure means being temperature-reactive and/or manually operable.

17 Claims, 22 Drawing Sheets

(51) Int. Cl.
  *F16K 11/07* (2006.01)
  *F16K 31/00* (2006.01)
(58) Field of Classification Search
  CPC ............. F16K 27/041; F16K 31/5245; F16K 31/52475; F16K 17/386; F16K 15/044; F16K 11/072; G05D 23/02; G05D 23/1346; G05D 23/1858; G05D 7/014
  USPC ........................................ 236/12.2
  See application file for complete search history.

(56) References Cited

U.S. PATENT DOCUMENTS

| | | | | |
|---|---|---|---|---|
| 3,595,474 A * | 7/1971 | Humpert | ............... | F16K 11/02 137/454.2 |
| 3,913,830 A * | 10/1975 | King | ............... | G05D 23/1346 236/12.22 |
| 4,381,073 A * | 4/1983 | Gloor | ............... | G05D 23/1353 137/606 |
| 4,767,052 A * | 8/1988 | Kostorz | ............... | G05D 23/1346 236/12.22 |
| 5,251,811 A * | 10/1993 | Frankholz | ............... | G05D 23/1346 236/12.16 |
| 5,730,167 A * | 3/1998 | Enoki | ............... | F16K 11/07 137/15.02 |
| 6,315,209 B1 * | 11/2001 | Tripp | ............... | G05D 23/1346 236/12.13 |
| 6,315,210 B1 * | 11/2001 | Kline | ............... | G05D 23/134 236/12.2 |
| 6,471,132 B1 * | 10/2002 | Knapp | ............... | G05D 23/1346 236/12.2 |
| 6,575,377 B1 * | 6/2003 | Graves | ............... | G05D 23/136 236/12.2 |
| 6,929,188 B2 * | 8/2005 | Taylor | ............... | G05D 23/1313 236/12.12 |
| 7,100,636 B2 * | 9/2006 | King | ............... | E03B 1/04 137/597 |
| 7,287,707 B2 * | 10/2007 | Kempf | ............... | E03B 7/045 137/337 |
| 7,913,926 B2 * | 3/2011 | Goncze | ............... | G05D 23/1346 236/12.11 |
| 7,971,601 B2 * | 7/2011 | Lum | ............... | F16K 31/002 137/337 |
| 8,074,894 B2 * | 12/2011 | Beagen | ............... | G05D 23/1346 236/12.1 |
| 8,322,755 B2 | 12/2012 | Kluss et al. | | |
| 8,327,871 B1 * | 12/2012 | Franklin | ............... | G05D 16/0605 137/271 |
| D676,940 S | 2/2013 | Kluss et al. | | |
| D676,941 S | 2/2013 | Kluss et al. | | |
| D676,942 S * | 2/2013 | Kluss | ............... | D23/262 |
| D676,943 S * | 2/2013 | Kluss | ............... | D23/262 |
| 8,366,013 B2 * | 2/2013 | Chang | ............... | G05D 23/1393 236/12.2 |
| 8,434,691 B2 * | 5/2013 | Hong | ............... | F16K 11/044 137/625.41 |
| D693,429 S * | 11/2013 | Thibodeaux, Jr. | ............ | D23/233 |
| 8,733,666 B2 * | 5/2014 | Beagen | ............... | F16K 31/002 236/12.1 |
| 9,027,845 B2 * | 5/2015 | Sansum | ............... | G05D 23/1353 236/12.1 |
| 9,134,737 B2 * | 9/2015 | Menet | ............... | G05D 23/134 |
| 9,140,451 B2 * | 9/2015 | Haedicke | ............... | F16K 31/082 |
| 9,228,681 B2 * | 1/2016 | Kluss | ............... | F16L 37/091 |
| 9,235,220 B2 * | 1/2016 | Goncze | ............... | G05D 23/1346 |
| 9,292,019 B2 * | 3/2016 | Auweder | ............... | F01P 7/16 |
| 9,504,970 B2 * | 11/2016 | Baker | ............... | G05D 23/1346 |
| 2002/0043286 A1 * | 4/2002 | Kline | ............... | G05D 23/134 137/606 |
| 2003/0155018 A1 * | 8/2003 | Kline | ............... | G05D 23/134 137/606 |
| 2004/0089728 A1 * | 5/2004 | Nember | ............... | G05D 23/1353 236/12.16 |
| 2004/0238650 A1 * | 12/2004 | Luig | ............... | G05D 23/1346 236/12.11 |
| 2005/0016599 A1 * | 1/2005 | Talaski | ............... | F16K 15/044 137/539 |
| 2005/0116053 A1 * | 6/2005 | Goncze | ............... | G05D 23/1346 236/12.11 |
| 2005/0127193 A1 * | 6/2005 | Taylor | ............... | G05D 23/134 236/12.15 |
| 2006/0070670 A1 * | 4/2006 | King | ............... | E03B 1/04 137/625.41 |
| 2006/0090798 A1 * | 5/2006 | Beagen | ............... | G05D 23/134 137/602 |
| 2006/0124758 A1 * | 6/2006 | Sansum | ............... | F16K 3/265 236/12.11 |
| 2006/0231637 A1 * | 10/2006 | Schmitt | ............... | B01F 5/0268 236/12.11 |
| 2007/0000547 A1 * | 1/2007 | Cochart | ............... | F16K 11/00 137/614.2 |
| 2007/0029395 A1 * | 2/2007 | Scott | ............... | G05D 23/1346 236/12.2 |
| 2007/0204999 A1 * | 9/2007 | Cowie | ............... | E21B 33/035 166/368 |
| 2008/0093469 A1 * | 4/2008 | Kline | ............... | F16K 15/025 236/12.2 |
| 2009/0001310 A1 * | 1/2009 | Hanson | ............... | E03C 1/04 251/366 |
| 2009/0007972 A1 * | 1/2009 | Lum | ............... | F16K 31/002 137/468 |
| 2010/0123014 A1 * | 5/2010 | Beagen | ............... | F16K 31/002 236/12.2 |
| 2010/0123015 A1 * | 5/2010 | Beagen | ............... | G05D 23/1346 236/12.2 |
| 2011/0089249 A1 * | 4/2011 | Johnson | ............... | G05D 23/1346 236/12.14 |
| 2011/0168927 A1 * | 7/2011 | Yuan | ............... | G05D 23/1346 251/11 |
| 2011/0203689 A1 * | 8/2011 | Chang | ............... | F16K 11/0716 137/602 |
| 2012/0104107 A1 * | 5/2012 | Goncze | ............... | G05D 23/1346 236/12.11 |
| 2012/0292540 A1 * | 11/2012 | Bruck | ............... | F16K 11/0716 251/14 |
| 2013/0098474 A1 * | 4/2013 | Tung | ............... | G05D 23/1313 137/98 |
| 2013/0200167 A1 * | 8/2013 | Auweder | ............... | F01P 7/16 236/93 R |
| 2014/0261744 A1 * | 9/2014 | Sansum | ............... | G05D 23/1353 137/15.18 |

(56) References Cited

U.S. PATENT DOCUMENTS

2015/0361644 A1* 12/2015 Warsowe ................ F16K 31/62
137/603
2017/0292251 A1* 10/2017 Dolgos ................ F16K 11/207

FOREIGN PATENT DOCUMENTS

FR         2533656 A1 *  3/1984  ............. F16K 27/02
FR         2535433 A1 *  5/1984  .......... F16K 11/0787

OTHER PUBLICATIONS

European Supplementary Search Report issued in corresponding EU Patent Application No. 14765098.0 dated Nov. 16, 2016, 2 pages.

\* cited by examiner

WATER TEMPERATURE REGULATING VALVE

FIELD OF THE INVENTION

This invention relates to valves for fluid temperature regulating systems and more particularly to water temperature regulating valves intended for use in hydronic heating systems, but the use of the invention is not restricted to that particular field.

BACKGROUND OF THE INVENTION

Mixing valves having valve bodies configured to combine flaws of hot and cold fluids to provide mixed fluids having a controlled temperature are described in disclosures of patent specifications such as International Patent Application No. PCT/US02/27056 published as WO 03/019315.

In hydronic heating systems the role of a water temperature regulating valve is to: (1) receive high temperature water from a boiler or similar heat source; (2) receive lower temperature water returning from the heating loops of the hydronic heating system; (3) output water at a constant temperature to the heating loops of the hydronic heating system by regulating the relative flow rates of the high and lower temperature water through the valve; and (4) ensuring that any additional water added to the hydronic heating system from the boiler or similar heat source is replaced by a corresponding amount of water being returned to the boiler or similar heat source (a requirement arising from the fact that the output water is going to a closed loop which returns the water temperature regulating valve). Additionally it is important that the water temperature regulating valve provide overall temperature control to the hydronic heating system so as prevent damage to floor structures or floor coverings.

Regulation of the water temperature is achieved by a mechanism commonly used in tempering valves and thermostatic devices.

Generally, in these types of valves, the required flow passages to direct the high temperature water and lower temperature water to regulating gaps are formed by cast or mechanical channels within a brass valve body.

SUMMARY OF THE INVENTION

According to one aspect of the present invention there is provided a water temperature regulating valve including a valve body having a cavity in which mixing of fluids can occur, and provided with a hot fluid (or heated water) inlet adapted for communication with a source of hot (or heated) water, a cooled fluid inlet adapted for communication with an apparatus that has used the mixed fluid for heating, a mixed fluid outlet adapted for communication with an apparatus that uses the mixed fluid for heating, and a return fluid outlet adapted for communication with the source of hot (or heated) water, all inlets and outlets also being in communication with the cavity provided within the valve body, said cavity being provided with an insert in a sealing relationship with an inner surface of the said cavity, said insert having a central bore and also defining flow passages and being configured to direct the flows of hot fluid entering the cavity via the hot fluid inlet and cooled fluid entering the cavity via the cooled fluid inlet, the flow passages defined by the said insert interacting with moveable closure means to selectively permit, restrict or prevent the flows of hot fluid and cooled fluid into the cavity, and mixed fluid and return fluid out of the cavity, said moveable closure means being temperature-reactive and/or manually operable.

Generally, in known types of water temperature regulating valves, the required flow passages to direct the hot and cooled water to regulating gaps are formed by cast or machined channels within a brass valve body. In the case of these types of heating system valves, casting is invariably the method chosen. In the present invention, a separate shell-like insert has been used to form or define all the flow passages within a simplified forged and machined valve body. Preferably, the insert is shell-like. Preferably the flow passages are defined by ridges provided on the outer surface of the insert which ridges can enter into sealing relationships with the inner surface of the valve body. The ridges may be moulded onto or otherwise permanently affixed to the outer surface of the insert. The insert preferably is constructed of injection moulded thermoplastic moulded over with a thermo plastic elastomer (TPE) seal. The TPE seal/thermoplastic valve combination allows for a dramatic reduction in weight, as the brass internals that would normally be used in the valve are replaced by a lightweight plastic insert. Advantageously, the brass valve body can then be a simple, thin shell with inlets and outlets. Further the invention allows for the application of a wider range of manufacturing technology is such as forging and the use of materials other than brass, such as plastics.

The moulded TPE seal on the insert provides a static seal between the insert and an inner surface of the valve body. The general shape of the insert is a critical aspect of the invention. The static sealing face between the insert and the interior of the valve body preferably is tapered, instead of being a straight bore. This allows the insert to be placed almost into the fully assembled position before the TPE seal is compressed, thereby minimizing or preventing damage to the seal during assembly. Also, the taper results in a large amount of force pushing the seal into the interior of the valve body, which provides an improved seal, minimising the loss of sealing by compression set in the TPE material, as there will continue to be force pushing it against the interior of the valve body.

Preferably the central bore of the insert is offset compared to the interior of the valve body which allows a greater outlet cross section for increased flow without affecting inlet flow, which is advantageous. The insert is provided with at least one cut-out, preferably a plurality of cut outs, communicating with the central bore of the insert, and at least one moulded recess, preferably a plurality of moulded recesses, on its outer surface, to permit communication between different inlets and outlets and the flow through of water during different phases of operation of the temperature regulating valve. The dimensions, positioning and orienting of the cut-out/s and moulded recess/es can vary according to desired behaviour or characteristics of the water temperature regulating valve.

The overall design of water temperature regulating valves according to the present invention allows for more flexibility in effecting different outlet to inlet arrangements with the same valve body. The insert can have various shapes providing different inlet/outlet and performance characteristics while retaining the same valve body and other internal components.

In the course of assembling the valve, an O-ring is first positioned onto the insert, then an O-ring retainer is pushed into the insert and is held in place with a plastic snap fit. A dove tail groove is formed between the opposing faces of the insert and O-ring retainer. The dove tail groove for the O-ring prevents dislodgement of the O-ring during high flow velocity. Using a standard elastomer O-ring and standard dove tail groove dimensions resolves many problems that may arise with using TPE/thermoplastic valve overmoulded situations. Advantages include improved compression set, reduced sticking in the bore, replaceable components, full range of potable water approvals, greater range of temperatures, greater range of fluid resistance and cheaper to manufacture.

The movable closure means preferably includes a thermostatic element cooperative with a piston, which is mounted on an upper surface of the thermostatic element and which piston can adopt a sealing relationship with the inner face of the insert and other parts of the valve. The piston is received within the insert and can move upwardly or downwardly with respect to the insert. The thermostatic element can be a known flat diaphragm element which expands and contracts in a known manner with changes in temperature. The interaction between the thermostatic element and piston is such that the expansion or contraction of the thermostatic element results in movement of the piston. Preferably the piston and the thermostatic element are constrained from displacement within the cavity of the valve body by a spring on the upper end of which the thermostatic element rides. The extent of upward movement of the thermostatic element is limited by the bottom end of a spindle passing through a cap mounted at the open end of the cavity of the valve body. Because of the advantageously increased flow resulting from the offsetting of the central bore of the insert with respect to the interior of the valve body, the amount of interaction between the upper end of the thermostatic element and the bottom end of the spindle is increased. Preferably a disc or button of material more durable than that of the spindle is provided in a recess provided in the bottom end of the spindle, to reduce wear on the bottom end of the spindle arising from interaction with the upper end of the thermostatic element. The spindle is connected to a temperature indicating knob assembly and passes through the cap, preferably via a cooperating screw thread arrangement. The extent of upward movement of the piston is limited by the bottom face of the cap. The knob of the knob assembly can be turned to indicate a particular temperature and the spindle rotates with the knob and, via the screw thread arrangement, moves upwardly or downwardly relative to the cap.

The thermostatic element typically includes a non-expanding part and an expanding part, usually a wax, contained in a cup. When the temperature of water surrounding the thermostatic element increases, the wax expands and pushes against a diaphragm within the thermostatic element which in turn transmits force and movement via an internal plug to a non-expanding internal piston. If the non-expanding internal piston is in contact with the bottom end of the spindle the thermostatic element and piston are pushed away from the underside of the cap. Conversely, when the temperature of the water surrounding the thermostatic element decreases, the wax contracts and the spring pushes the thermostatic element and piston towards the underside of the cap.

The 4 port design of the water temperature regulating valve with integrated return to the boiler allows the valve to seal off the heated water inlet port while keeping the return from the manifold and supply to the manifold open. This allows the valve to seal off the hot water supply from the hot water system while leaving the pump running—therefore no additional pump protection cut off or pressure bypass valve is required when the hot (heated) water supply is closed off. The valve closes this automatically when the temperature increases above a certain level. This is a significant feature as it minimizes the risk of water spillage and/or heat damage to floors due to increased temperature levels.

Preferably, indexing flexible bumps on the locking ring provide protection against self-opening of the spindle as fluid pressure may cause it to self-open in extreme cases (due to unwinding of the screw thread). Plastic arms push bumps into corresponding grooves on the outer side of a hollow shaft descending from the underside of the knob resulting in additional force required to unscrew the spindle to the next groove on the knob.

It is anticipated that a temperature regulating valve according to the present invention may be used in other situations and with other fluids where temperature control in a closed fluid flow system is required. The materials used to construct such valves may have to be changed.

DESCRIPTION OF PREFERRED EMBODIMENT

In order that the invention may be more clearly understood a preferred embodiment is now described with reference to the accompanying drawings in which:

FIG. 4b is an elevational view of the insert shown in FIG. 4a;

FIG. 4c is another perspective view of the insert shown in FIG. 4a;

FIG. 4d is a perspective view from below of the insert shown in FIG. 4a;

FIG. 4e is a cross-sectional view through the insert shown in FIG. 4a;

FIG. 14b is a detailed close up sectional view of area L of FIG. 14a;

Throughout the drawings the embodiment of the water temperature regulating valve according to the present invention is designated generally by the numeral 10, with the valve body being identified by the numeral 12 and the insert by the numeral 24.

Figure 1:
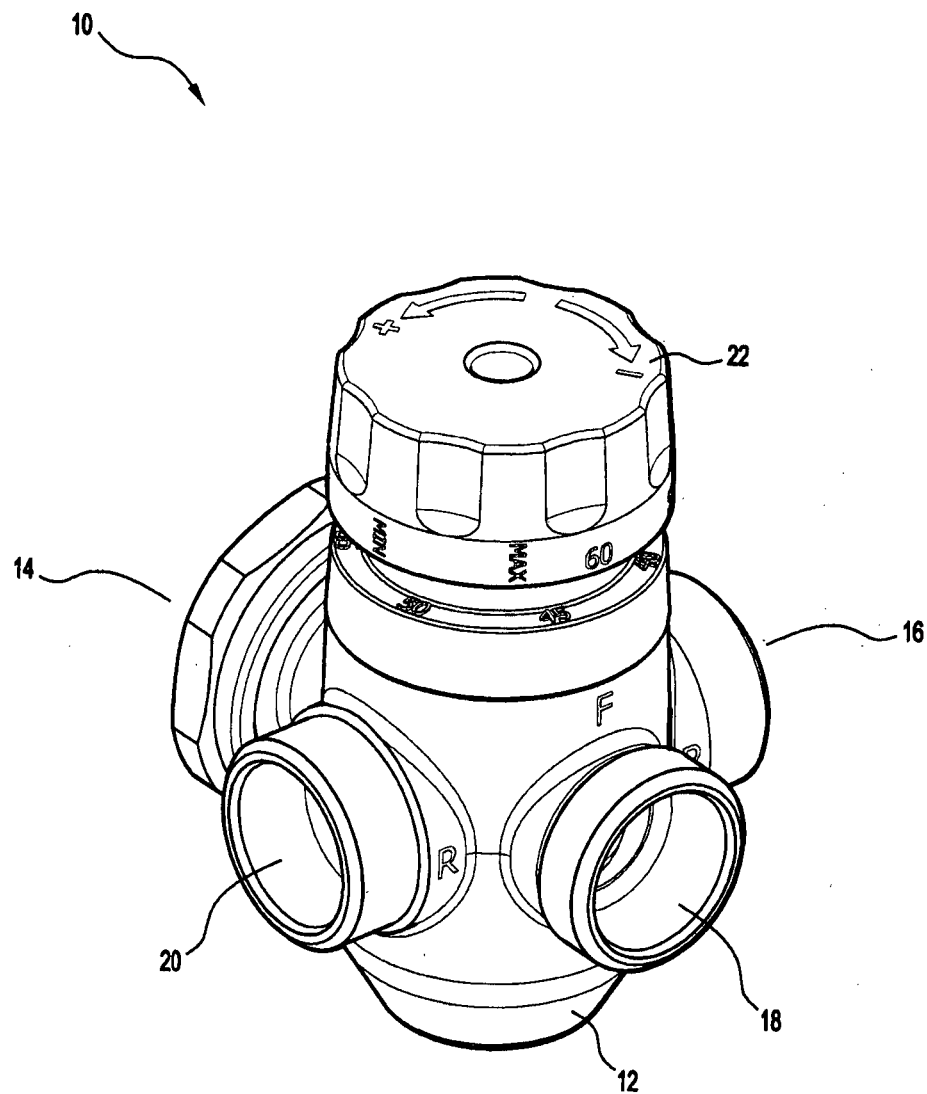
FIG. 1 depicts a perspective view of a preferred embodiment of the invention.

As shown in FIG. 1, the valve 10 includes a body 12 provided with an outlet (14) for supplying temperature regulated water to heating loops in a hydronic heating system (not shown), a cooled water inlet (16) for return of water from the aforesaid heating loops, a hot water inlet (18) for supply of heated water from a boiler (not shown), an outlet (20) for return of water to the aforesaid boiler, and a temperature control knob (22).

Figure 2:
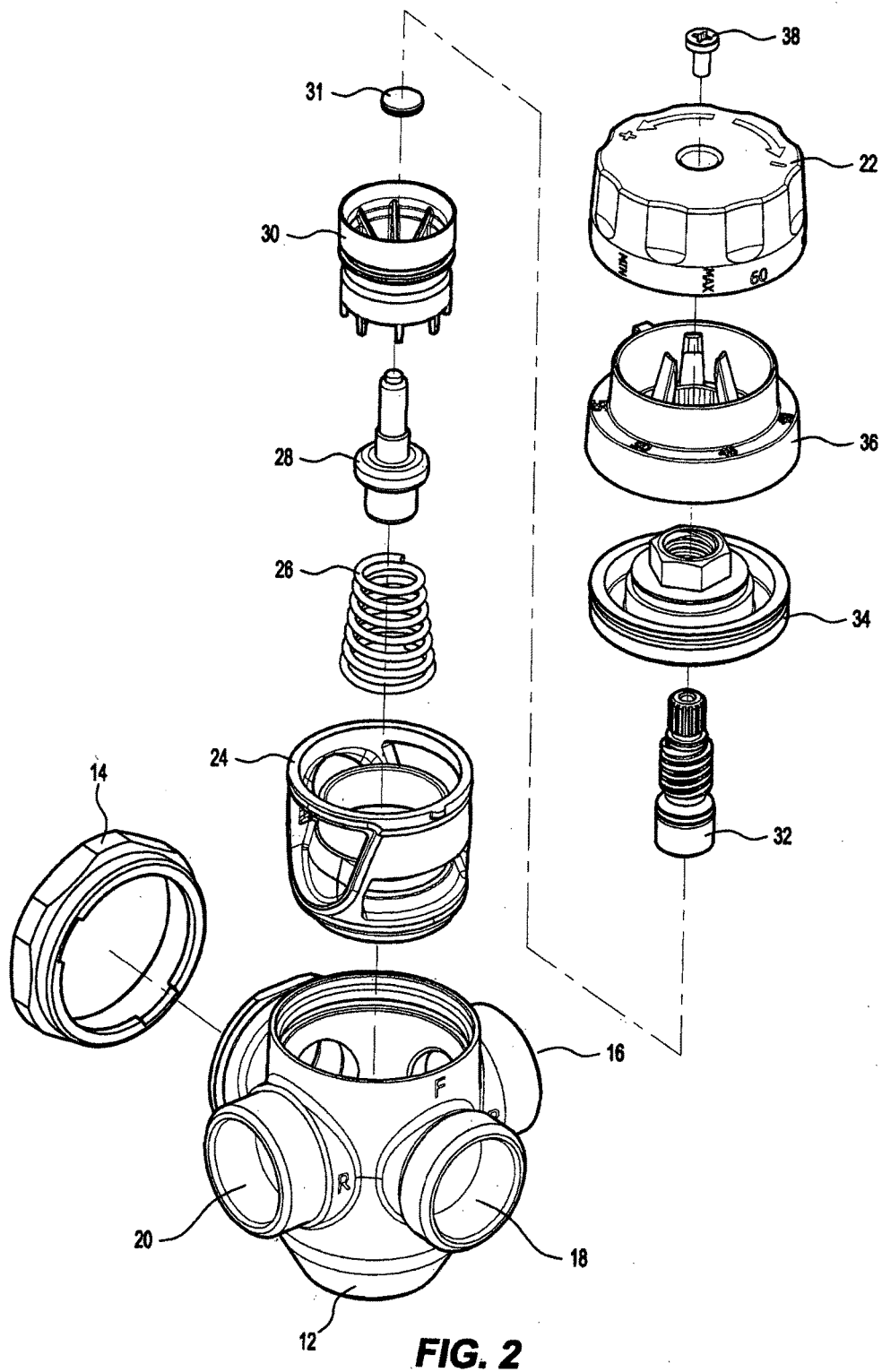
FIG. 2 depicts an exploded view of the embodiment of FIG. 1.
Figure 3:
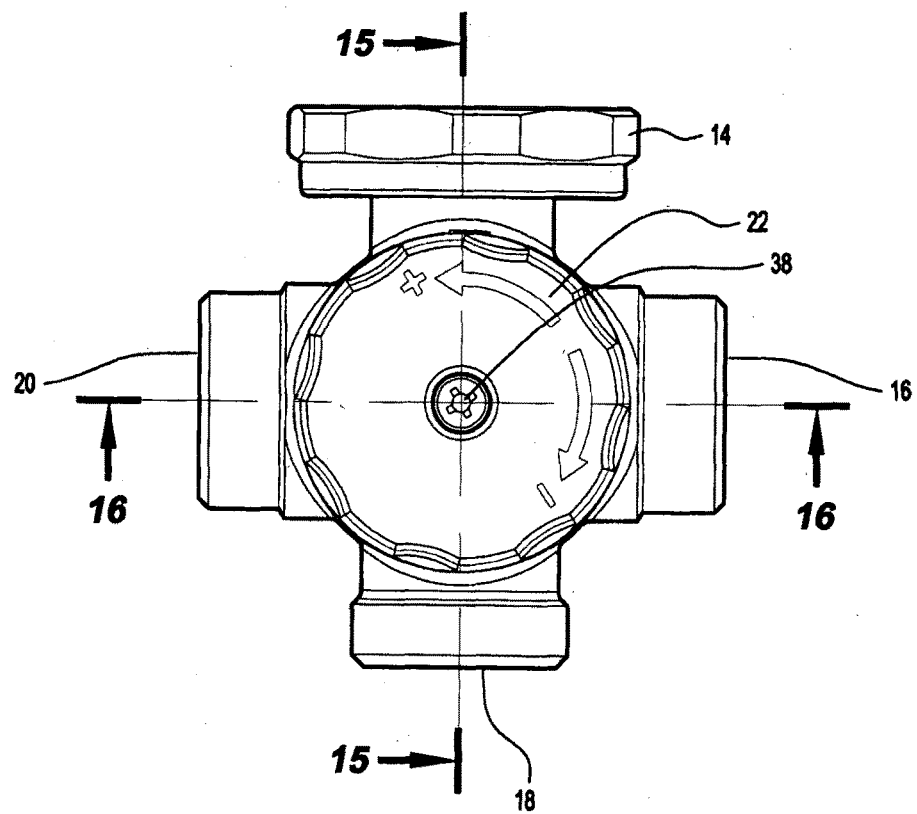
FIG. 3 depicts a view of the embodiment of FIG. 1 from the viewpoint of the temperature control knob.

As seen in FIG. 2, the valve 10 also includes a retaining nut (15), an insert (24), a spring (26), a thermostatic element (28) a piston (30), a button or disc (31), a spindle (32), a cap (34), a locking ring (36), and a knob retaining screw (38).

Figure 4A:
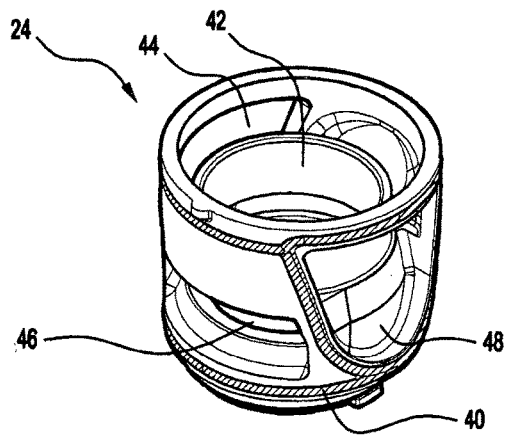
FIG. 4a is a perspective view of an insert as shown in FIG. 2 according to the preferred embodiment of the invention.
Figure 4B:
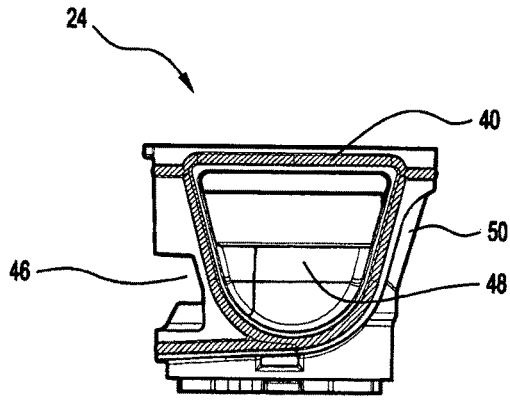
Figure 4C:
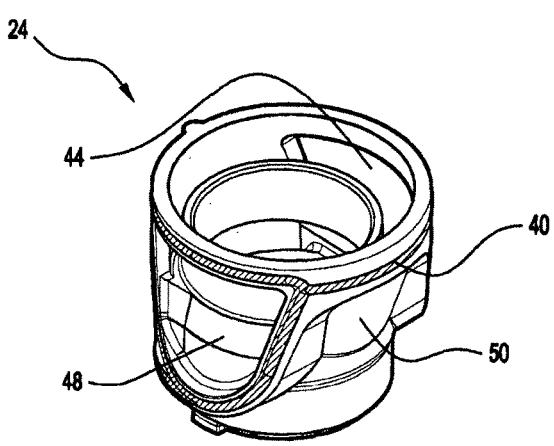
Figure 4D:
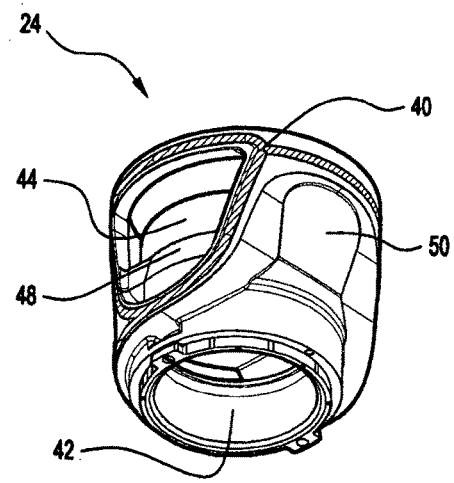
Figure 4E:
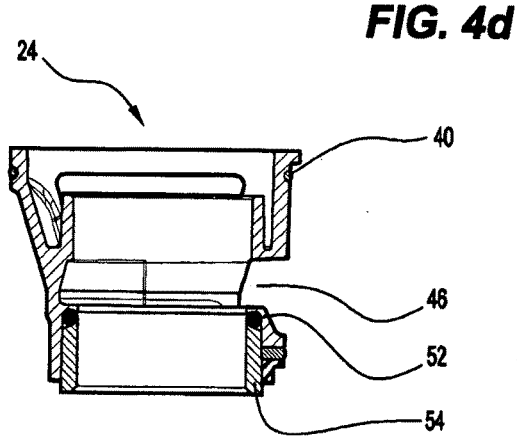
Figure 5:
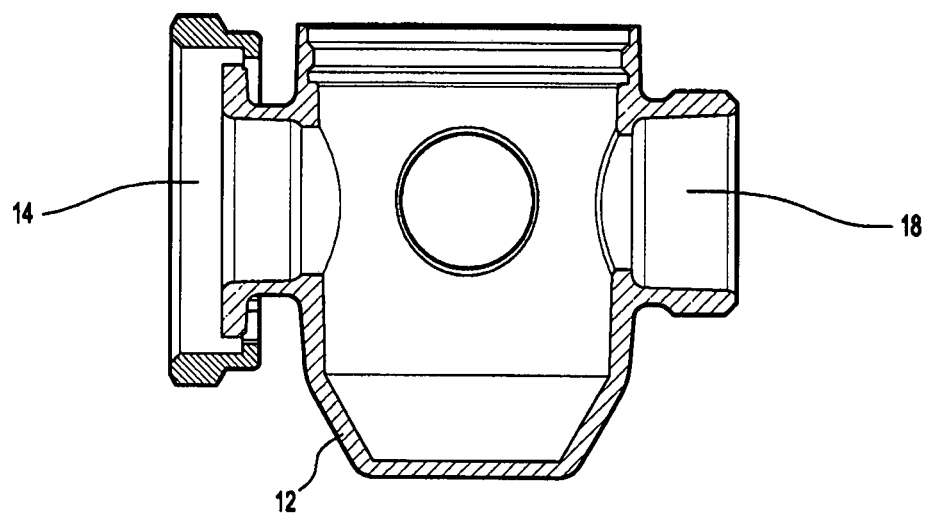
FIG. 5 is a cross-sectional view through the valve body of the preferred embodiment along the line passing through the outlet to the heating loops and the inlet from the hot water system.
Figure 6:
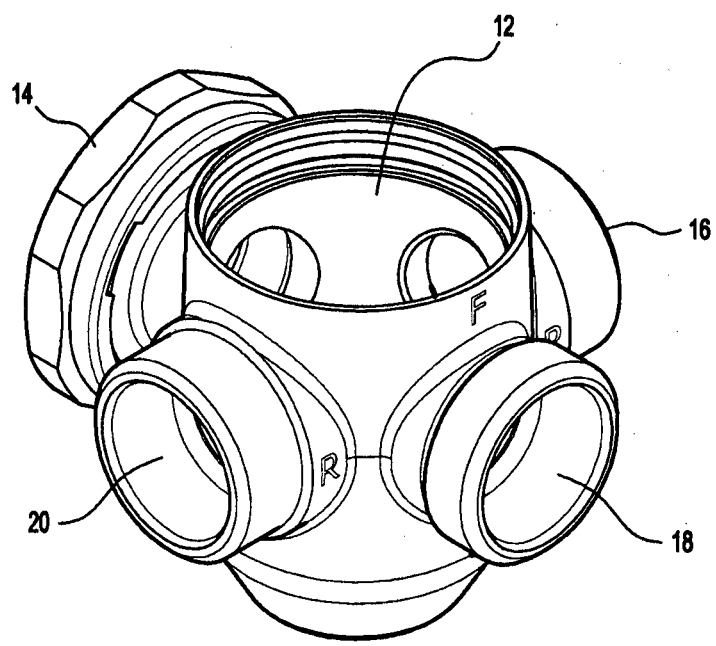
FIG. 6 is a perspective view of the insert and the valve body of the preferred embodiment showing the alignment of the insert and valve body at the time of insertion.
Figure 7:
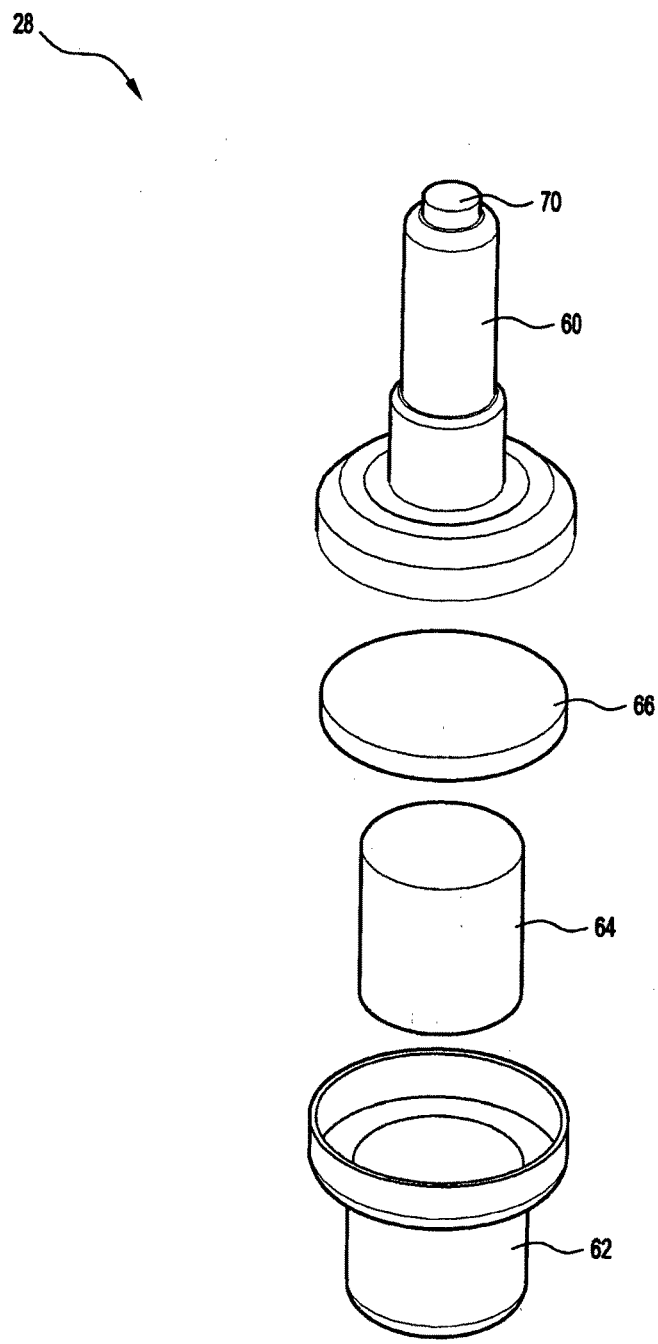
FIG. 7 is a perspective exploded view of the thermostatic element used in the embodiment of the invention.
Figure 8:
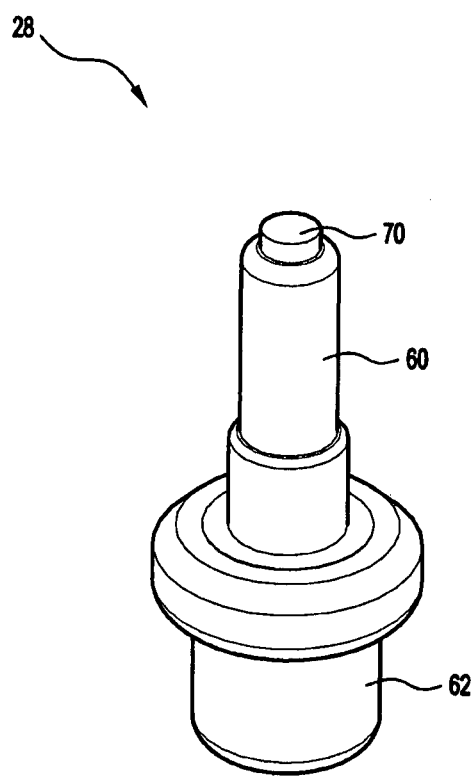
FIG. 8 is an elevational view of the assembled thermostatic element.
Figure 9:
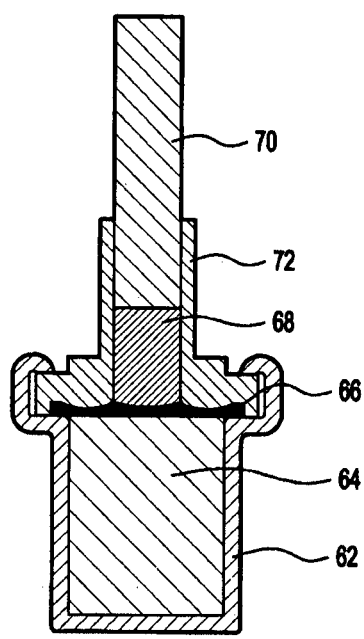
FIG. 9 is a cross-sectional elevational view of the assembled thermostatic element.
Figure 10:
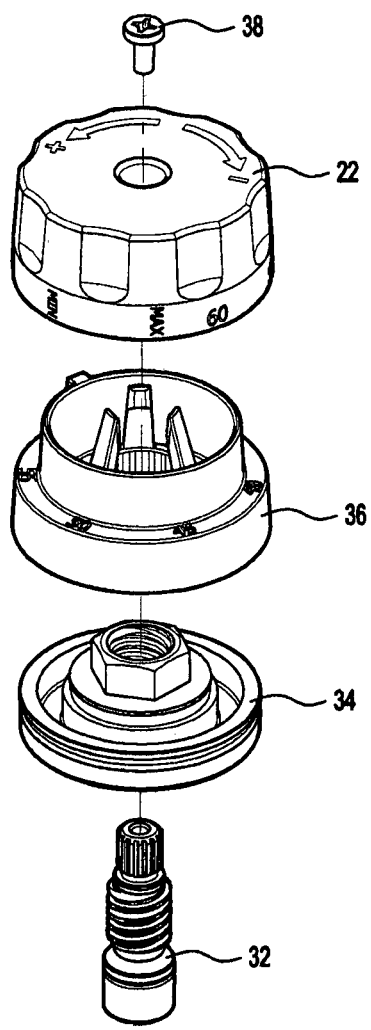
FIG. 10 is an exploded view of the temperature indication knob and spindle assembly.
Figure 11:
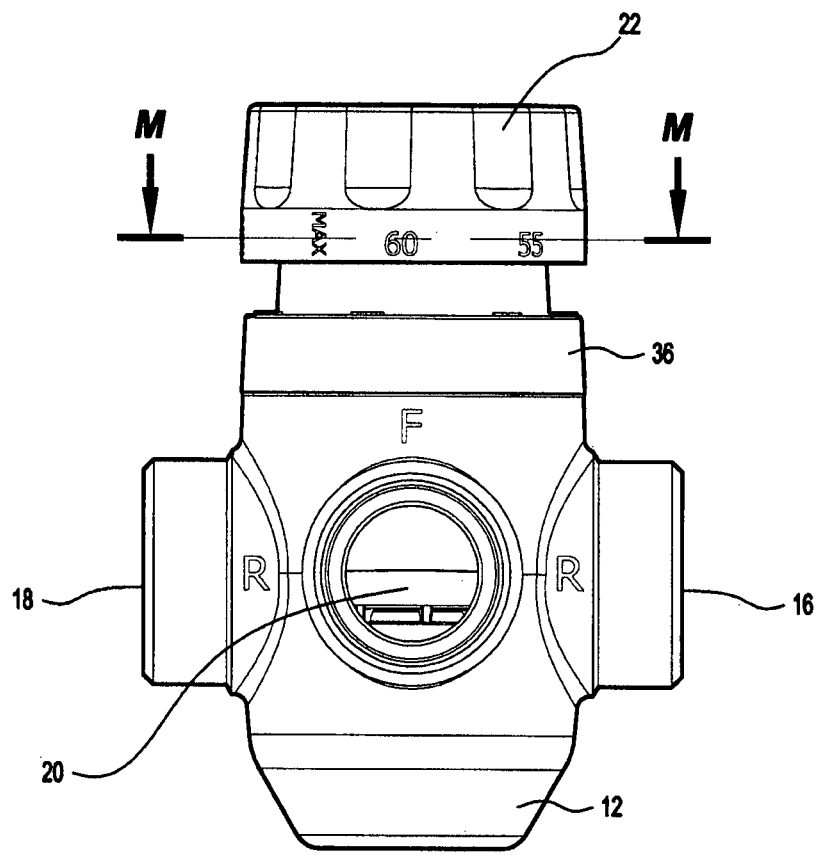
FIG. 11 is an elevational view of the embodiment of the invention.

Various views (including a sectional view) of shell-like insert (24) which is merely one embodiment of the insert of the present invention are shown in FIGS. 4a and 4e, inclusive. The insert, preferably constructed from a thermoplastic material by injection moulding, is provided with a moulded over thermoplastic elastomer seal (40) (shown as cross-hatched in FIG. 4). This seal (40) follows some of the contours of the insert (24). The insert (24) is also provided with a central bore (42), cut outs (44), (46) and recessed portions (48), (50) to permit communication between differing inlets and outlets and the flow-through of water during different phases of operation of the temperature regulating valve.

In the present invention, the insert (24) is used to define all the flow passages within a simplified forged and machined valve body (12). Insert (24) is constructed of injection moulded thermoplastic moulded over with a thermoplastic elastomer (TPE) seal (40). This allows for a dramatic reduction in weight, as the brass internals that would normally be used in such valves have been replaced by a lightweight plastic insert. Advantageously, the brass valve body can then be a simple, thin shell with inlets and outlets, which provides savings in materials used.

The static sealing face between the insert (24) and body (12) is tapered, instead of a straight bore (see FIG. 4e). This allows the insert (24) to be placed almost to its fully assembled position in the interior (13) of the valve body (12) before the TPE seal is compressed, preventing damage to the seal during assembly. Also, the taper means there is a large amount of force pushing the seal into interior (13) of the body, which provides an improved seal, minimising the loss of sealing by compression set in the TPE material, as there will still be force pushing it against the internal face of the valve body (12).

An offset central bore (42) of the insert (24) compared to the bore of body (12) allows a greater outlet cross section for increased flow without affecting inlet flow.

The overall design allows for more flexibility in providing different outlet to inlet arrangements with the same body. The general shape of this design is a critical aspect of the temperature regulating valve. The insert (24) can have many different shapes providing different inlet/outlet and performance characteristics with the same valve body and internal components.

Figure 13:
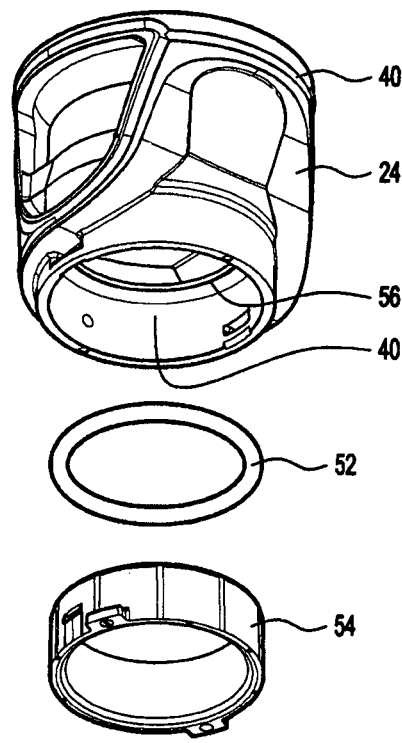
FIG. 13 is an exploded perspective view from below of the insert and retainer assembly.
Figure 14A:
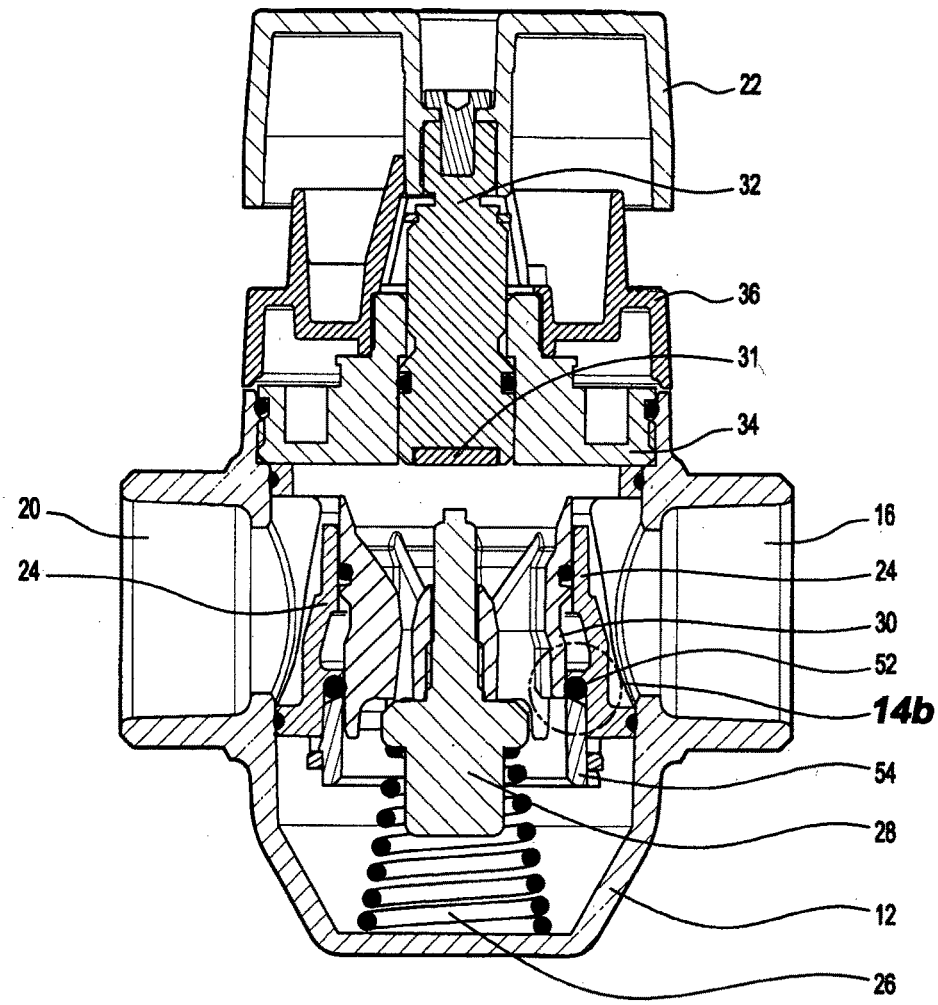
FIG. 14a is a cross-sectional view through the embodiment of the invention along the line passing through the return inlet from the heating loops and the return outlet to the hot water system.
Figure 14B:
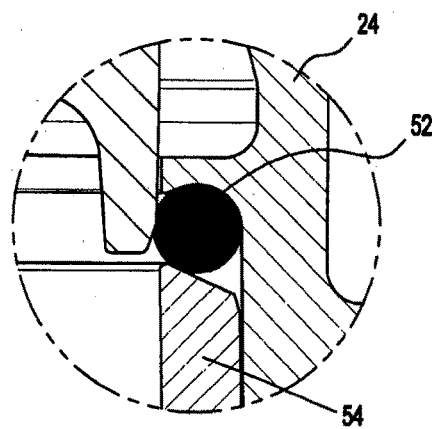
Figure 15:
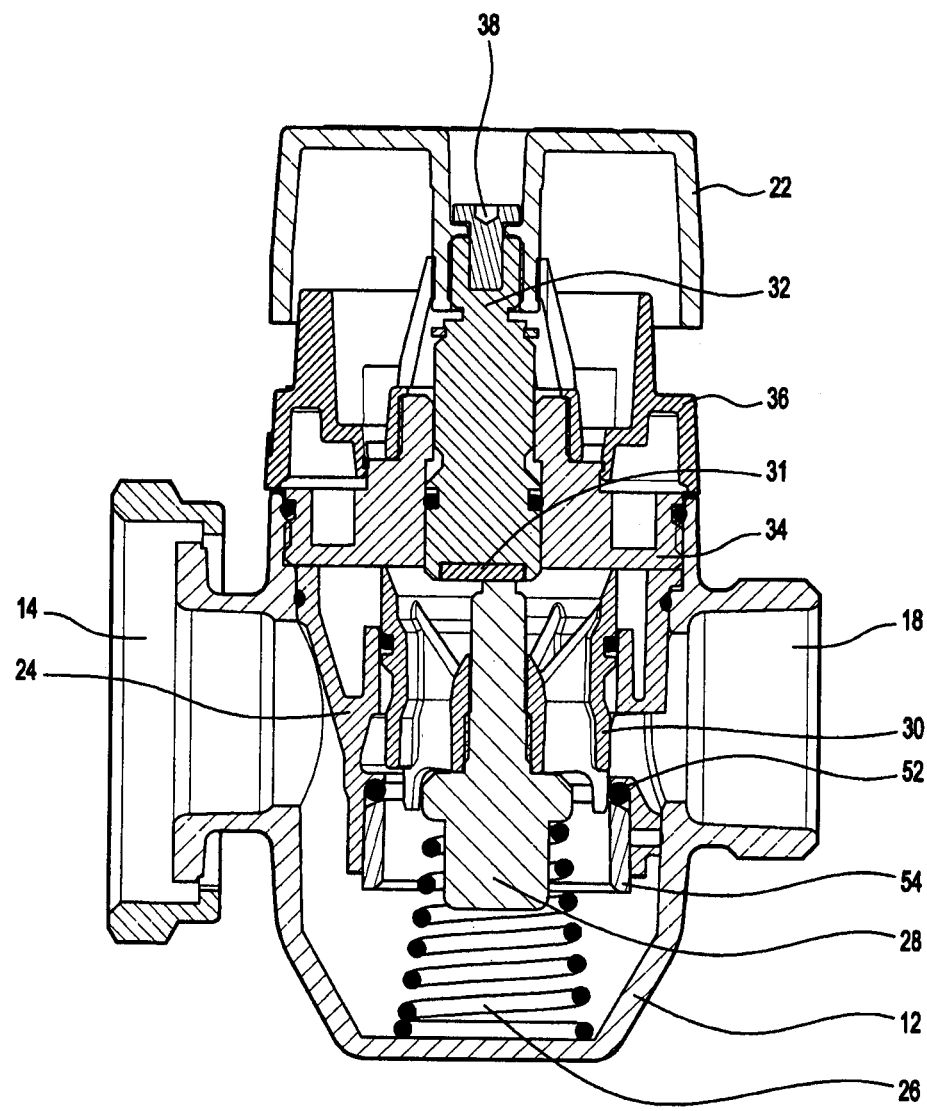
FIG. 15 is a sectional view of the embodiment of FIGS. 1 and 3 along line G-G of FIG. 3.
Figure 16:
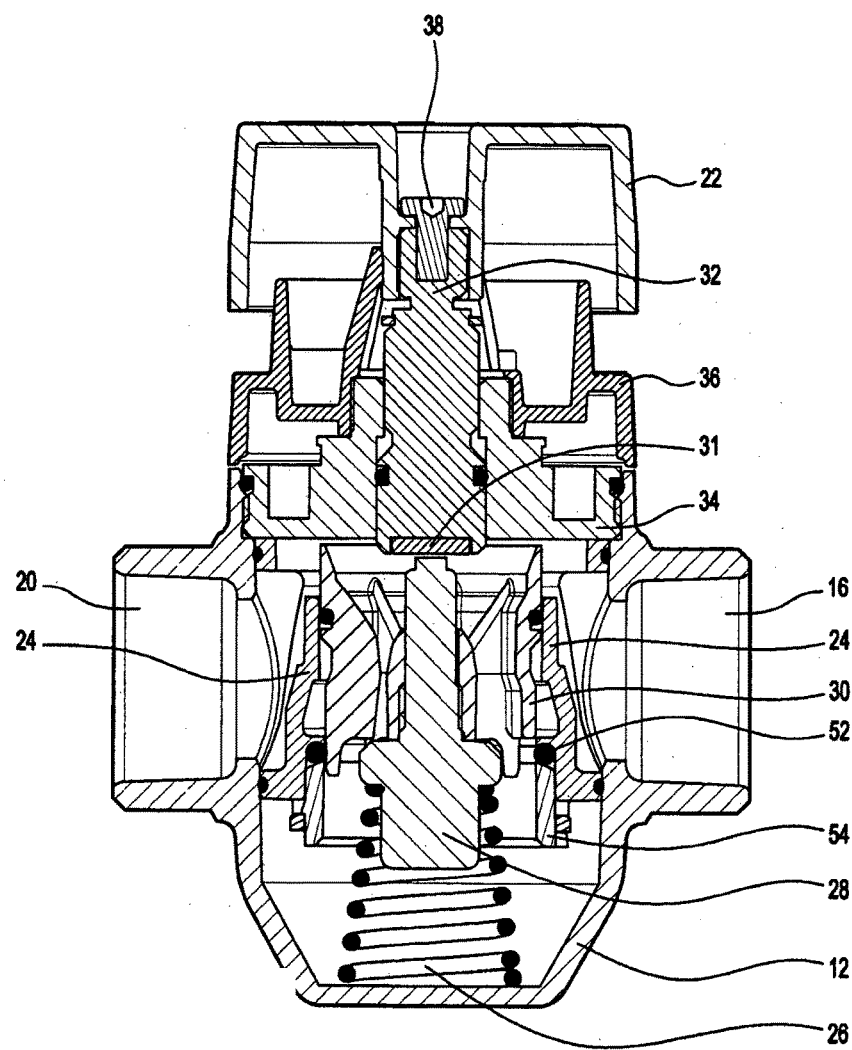
FIG. 16 is a sectional view of the embodiment of FIGS. 1 and 3 along line H-H of FIG. 3.

In FIG. 13, the numeral 52 designates an O-ring which fits into the inside of insert 24, and the numeral 54 designates an O-ring retainer. A dove tail groove (56) for the O-ring (52) prevents dislodgement due to high flow velocity. The O-ring (52) is first assembled into the insert (24), then the retainer (54) is pushed into the insert and is held into place by cooperating parts (53), (55) of plastic snap fits. The dove tail groove (56) is formed between the faces for the insert and retainer (54) as shown in FIGS. 13, 14a and 14b. Using a standard elastomer O-ring and standard dove tail grove dimensions prevents many problems with using TPE/TPV overmoulded solutions. Advantages include improved compression set, reduced sticking in bore, replaceable components, full range of potable water approvals, greater range of temperatures of operation, greater range of fluid resistance, and reduced costs in manufacture.

The 4 port design with integrated return to boiler allows the valve to seal off the hot water inlet port while keeping the return from the manifold and supply to the manifold open. This allows the valve to seal off the hot water supply from the hot water system while leaving the pump running—therefore no additional pump protection cut off or pressure bypass valve is required when the hot water supply inlet is closed. The valve closes this automatically when the temperature increase above a certain level.

Figure 12:
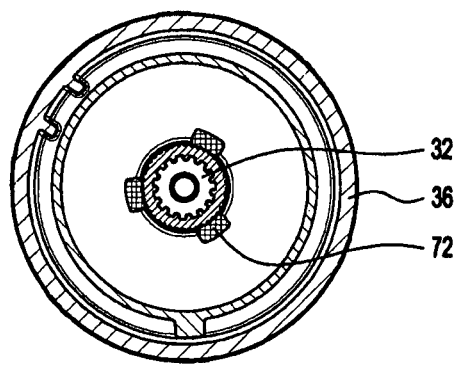
FIG. 12 is a cross-sectional view of part of the spindle assembly along line M-M of FIG. 11.

Indexing flexible projections (72) on the locking ring (36) provide protection against self-opening of the spindle (32) as fluid pressure may cause it to self-open in extreme cases (unwinding of the screw thread). FIGS. 12 and 14a shows how the projections (72) push into corresponding grooves (74) on the outer side of a hollow shaft (76) descending from the underside of temperature control knob (22) resulting in additional force required to unscrew the spindle to the next groove (74) on the hollow shaft (76).

Regulation of the water temperature is achieved by a mechanism commonly used in tempering valves and thermostatic devices. A thermostatic element (28), here a flat diaphragm element, expands and contracts in a known manner with changes in temperature.

Figure 17:
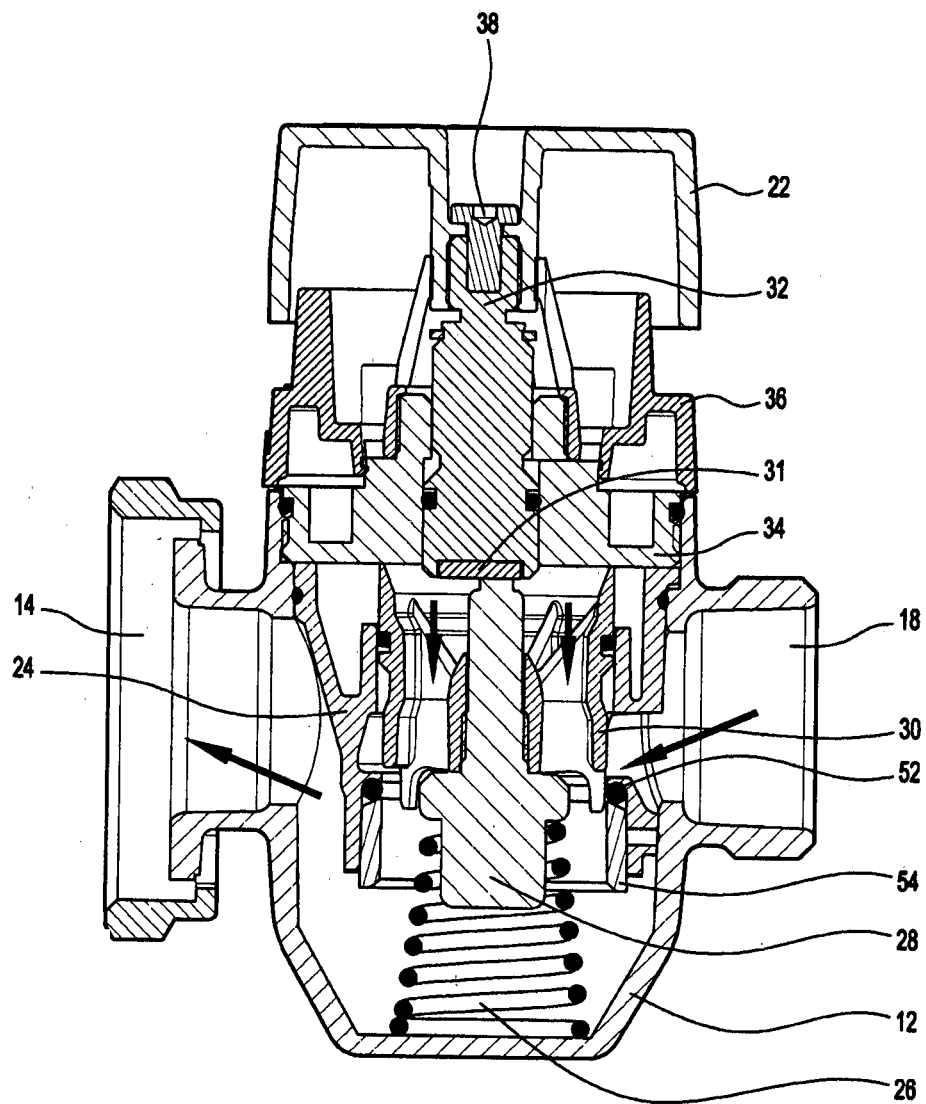
FIG. 17 is a schematic sectional view of the embodiment of FIGS. 1 and 3 along line G-G of FIG. 3 showing the embodiment in normal operation with both hot fluid and cooled water inlets open.
Figure 19:
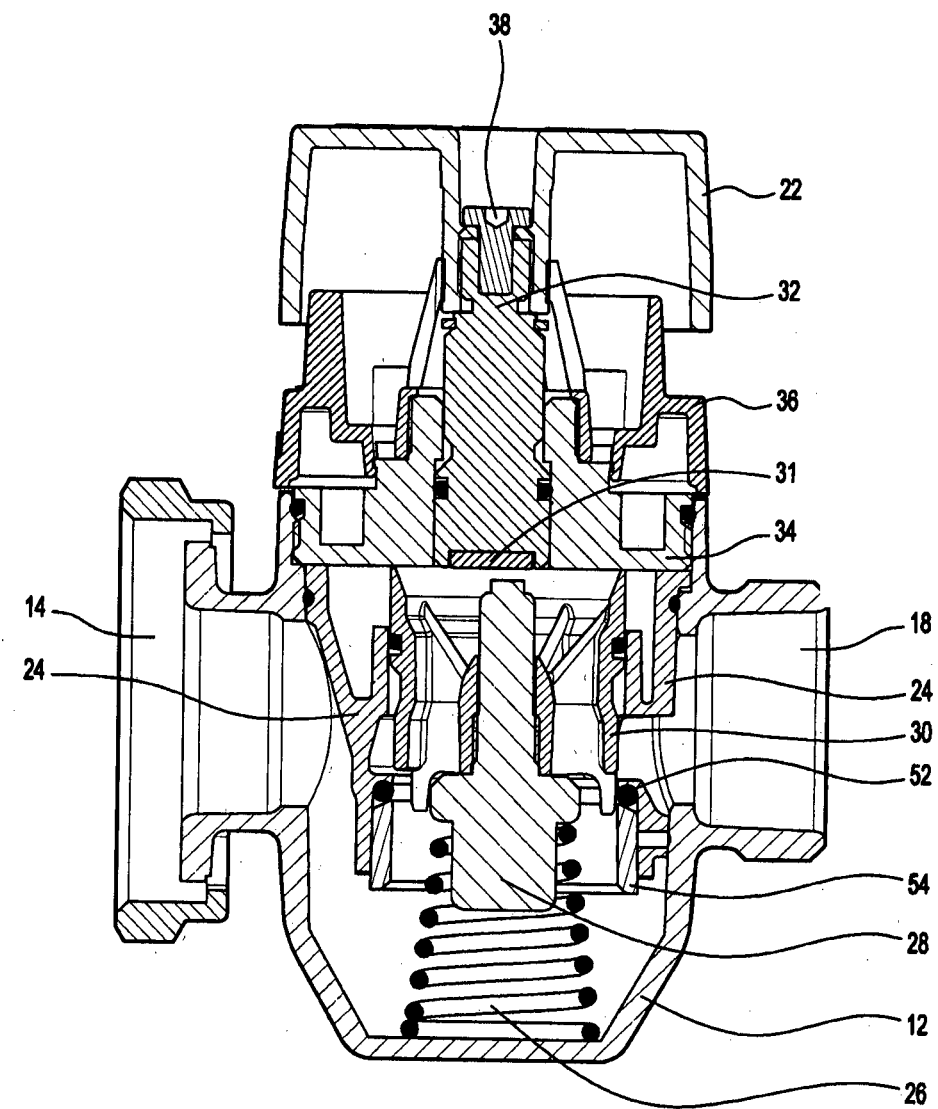
FIG. 19 is a schematic sectional view of the embodiment of FIGS. 1 and 3 along line G-G of FIG. 3 showing the embodiment in operation when the cooled water inlet has been shut off.
Figure 21:
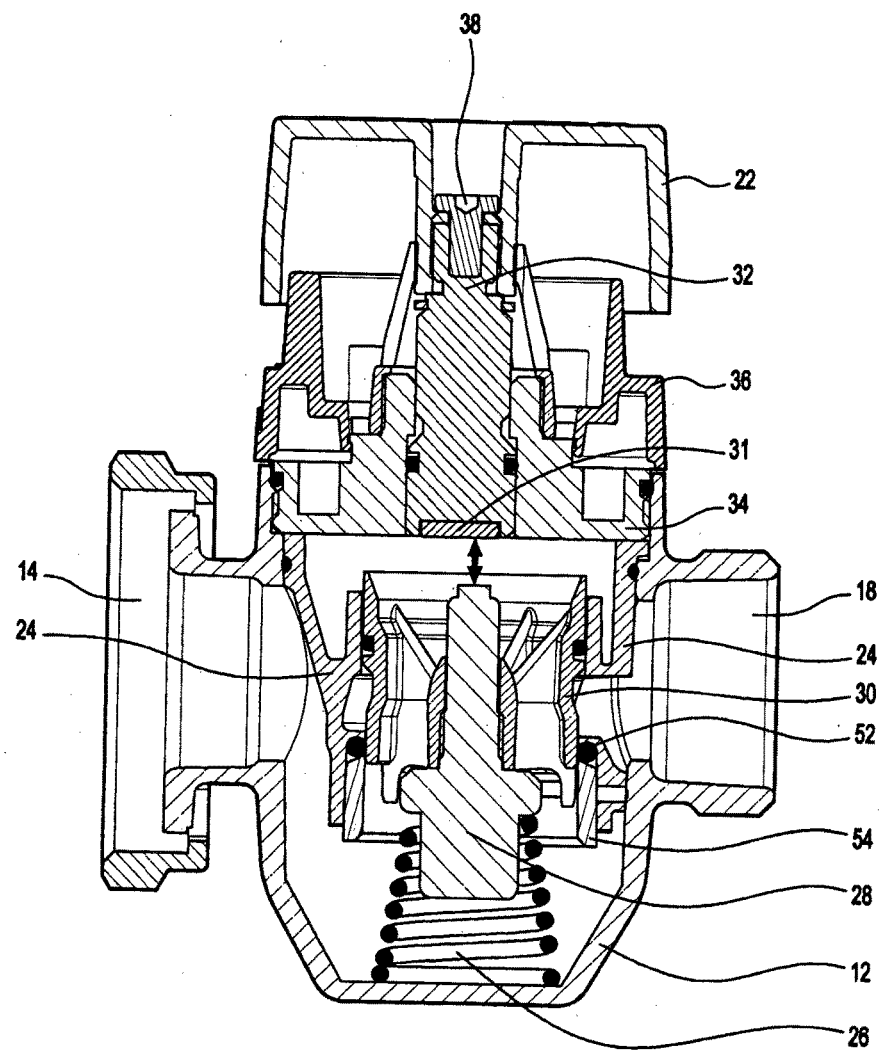
FIG. 21 is a schematic sectional view of the embodiment of FIGS. 1 and 3 along line G-G of FIG. 3 showing the embodiment in operation when the hot water inlet has been shut off.

The non-expanding part (60) of the element (28) is screwed onto internal piston (70). The expanding part of the element (28), usually a wax (64) contained in a cup (62), is pushed by spring (26) toward the spindle (32). Button or disc (31) (of a more durable material than the spindle (32) is provided in a recess in the bottom end of spindle (32) to meet the upper end of internal piston (70) and reduce wear on the bottom end of spindle (32) arising from contact with internal piston (70). In effect, the button or disc (31) acts as a thrust bearing. When the temperature of surrounding water increases, wax (64) expands and pushes against diaphragm (66) which transmits movement via internal plug (68) to internal piston (70) to thereby push the element (28) and piston (30) away from the cap (34), and conversely, when the temperature drops, the wax (64) in the element (28) contracts and the spring (26) pushes the element (28) the internal piston (70) and piston (30) towards the underside of the cap (34). Piston (30) can adopt a sealing, but not fixed, relationship with the inner face of insert (24) as can be seen in FIGS. 17, 19 and 21.

The distance of the top face of the piston (30) to the under face of the cap (34) forms a gap which regulates the amount of cooled water passing through the valve to the outlet. Thus when the element (28) is exposed to cooler water and shrinks, the piston (32) moves towards the cap (34) under the influence of spring (26), and restricts the flow of cooled water entering the valve. When the piston (30) moves all the way up to contact the cap (34) under face, it seals cooled water inlet (16) entirely.

The distance of the bottom face of the piston (30) to the O-ring (52) in the insert (24) forms a gap which regulates the amount of hot water passing through the valve. When the element (28) is exposed to hotter water and expands, the piston (32) moves down towards the O-ring (52), and restricts the flow of hot water entering the valve. When the piston moves all the way down, it creates a seal with the O-ring (52) and completely stops hot water from entering the valve.

As a consequence of the behaviour described above, the valve is able to maintain a constant outlet temperature (within a few degrees of tolerance) even when the supply of hot and cooled water pressure and temperature varies. The normal set temperature of the valve is set by positioning the spindle (32) up and down. As can be seen in FIG. 2, the spindle (32) and cap (34) are provided with cooperating threads (33), (35) so that the position of the spindle (32) relative to the cap (34) can be controlled by rotating the spindle (32) relative to the cap (34) by means of temperature control knob (22) which is secured to the upper end of spindle (32) by knob retaining screw (38). Depending on the position of the spindle (32), the thermostatic element (28) and piston (30) will sit at a specific height within the valve body (12) under stable inlet conditions which corresponds to specific temperature. If the spindle (32) is moved down (towards the hot inlet) the stable temperature will be relatively colder, and conversely if the spindle (32) is moved up, the stable temperature will be hotter.

The various situations are set out in FIGS. 17 to 22 in which the integers are as identified by the numerals used previously.

Figure 18:
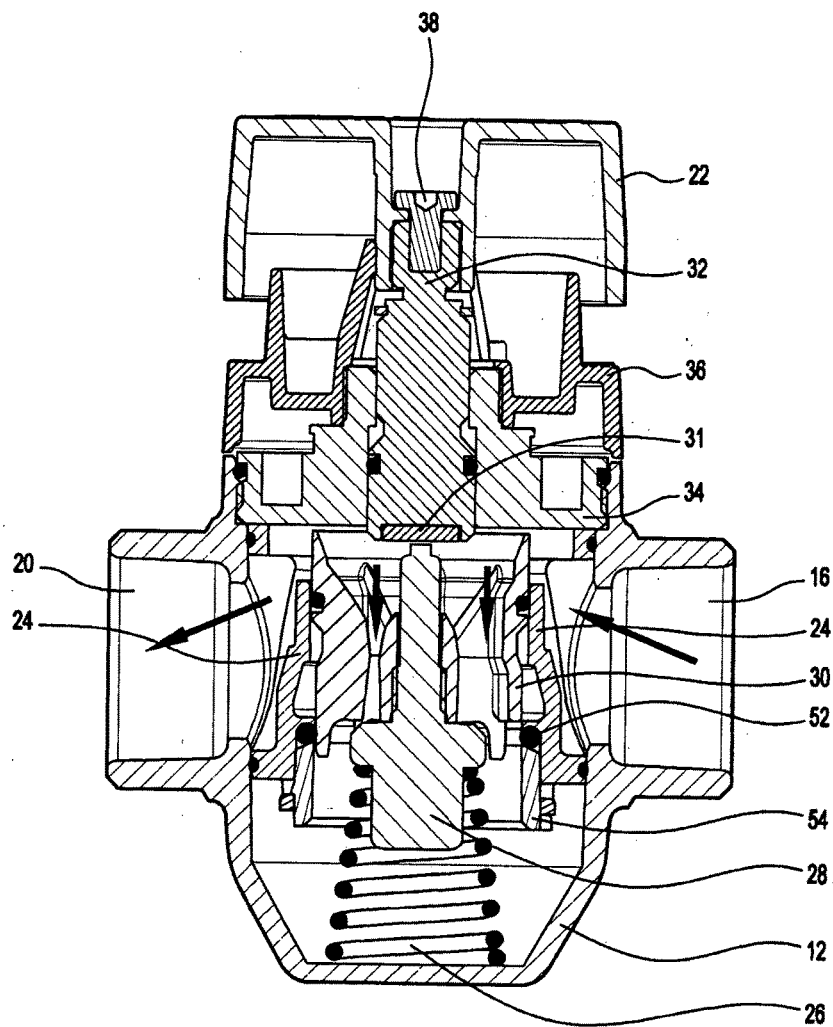
FIG. 18 is a schematic sectional view of the embodiment of FIGS. 1 and 3 along line H-H of FIG. 3 showing the embodiment in formal operation with both hot fluid and cooled water inlets open.

FIGS. 17 and 18 depict in cross-section the situation when both hot water inlet (18) and cooled water inlet (16) are open. This is typical of the valve in normal operation. The flow of water is indicated by the arrows.

Figure 20:
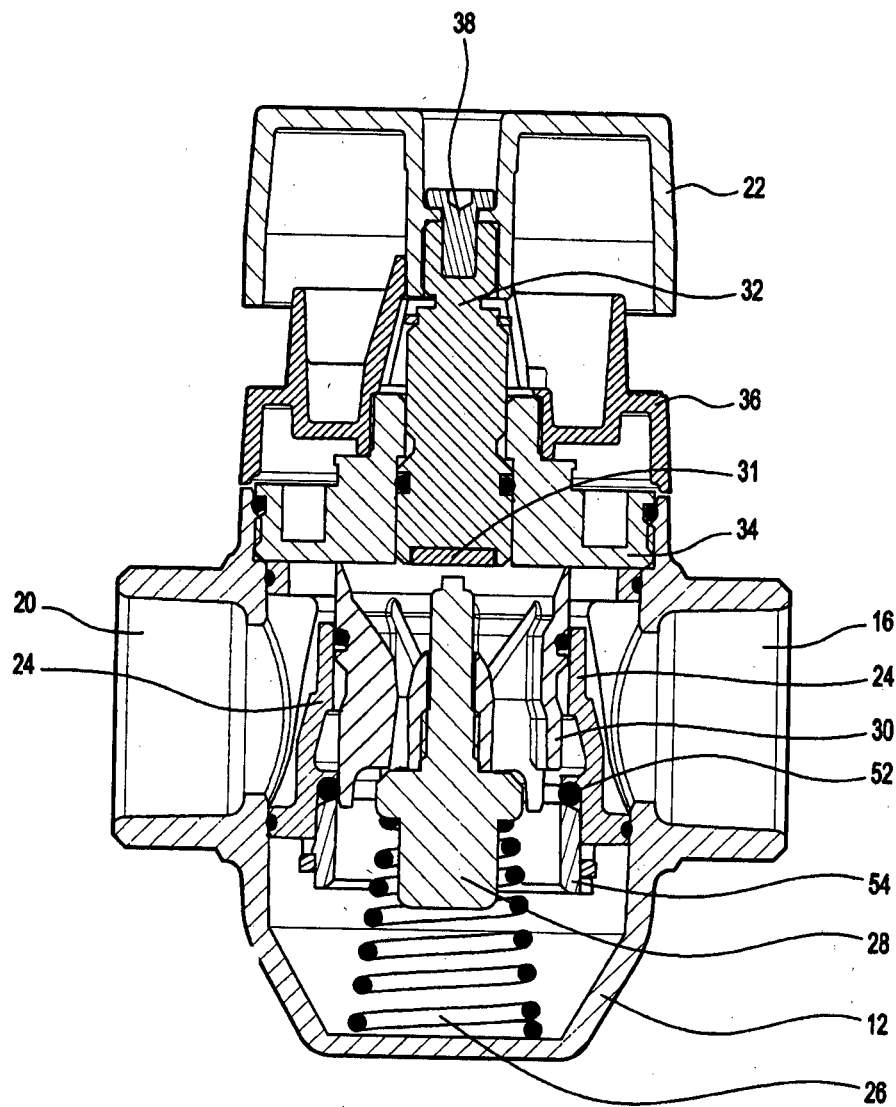
FIG. 20 is a schematic sectional view of the embodiment of FIGS. 1 and 3 along line H-H of FIG. 3 showing the embodiment in operation when the cooled water inlet has been shut off.

FIGS. 19 and 20 depict in cross-section the situation when the wax in the thermostatic element (28) has shrunk due to the presence of cooled water. As a result the cooled water inlet (16) is shut off by the piston (30) moving to meet with the underside of cap (34) and seal off the opening above the insert (24) for the entry of cooled water. The hot water inlet (18) remains open thereby admitting hot water to increase the temperature of the water in interior (13) of the valve body (12). The cooled water inlet (16) can also be shut off by winding the spindle (32) all the way up.

Figure 22:
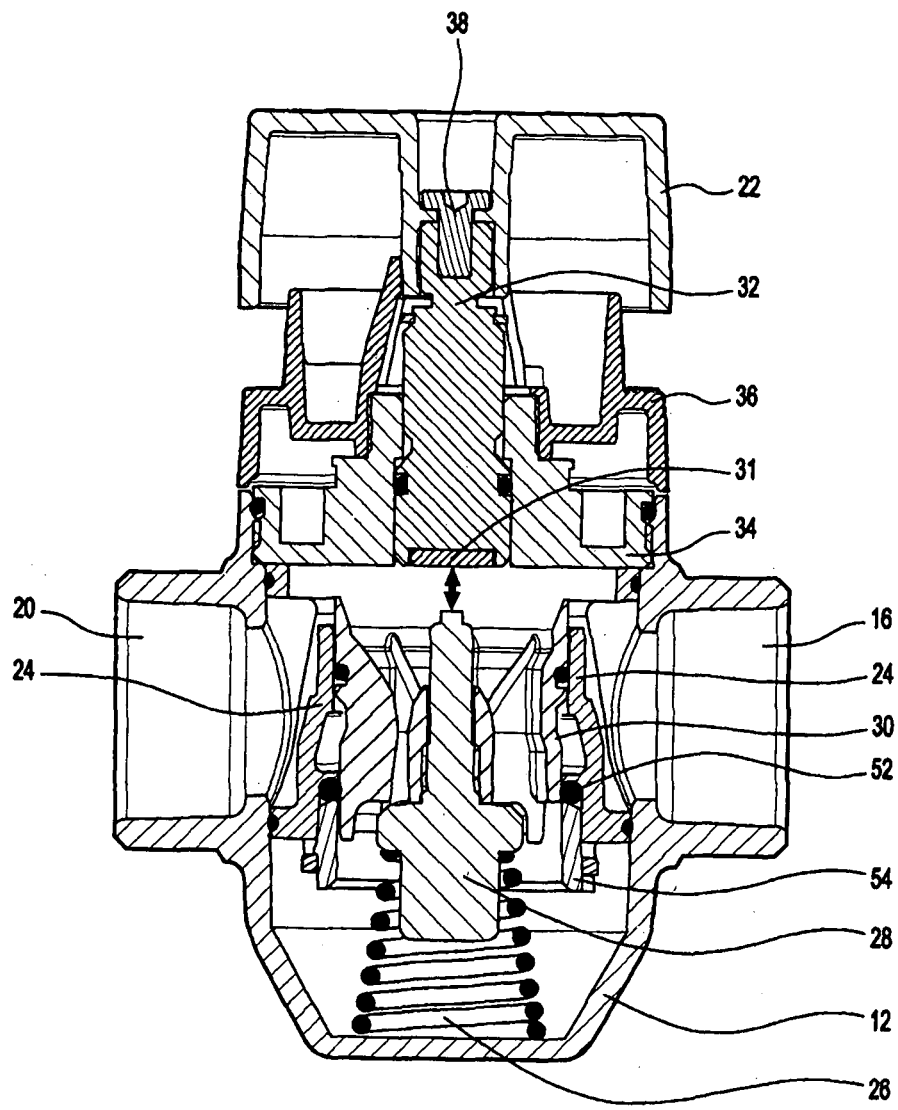
FIG. 22 is a schematic sectional view of the embodiment of FIGS. 1 and 3 alone line H-H of FIG. 3 showing the embodiment in operation when the hot water inlet has been shut off.

FIGS. 21 and 22 depict in cross-section the situation when the wax in the thermostatic element (28) has expanded due to the presence of hot water. As a result the hot water inlet (18) is shut off by the piston moving to seal off the hot water inlet opening in insert (24). The cooled water inlet (16) is open thereby admitting cooled water to lower the temperature of the water in the interior (13) of the valve body (12). The hot water inlet (18) can also be shut off by winding spindle (32) all the way down.

The complete disclosure of any patents, patent documents and publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

Throughout this specification and the claims which follow, unless the context requires otherwise, the word "comprise", and variations such as "comprises" or "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

The invention claimed is:

1. A fluid temperature regulating valve including:
 a valve body having a cavity in which mixing of fluids can occur to form a mixed fluid, and provided with:
  a first fluid inlet adapted for communication with a source of heated fluid;
  a second fluid inlet adapted for communication with an apparatus that has used the mixed fluid for heating;
  a mixed fluid outlet adapted for communication with an apparatus that uses the mixed fluid for heating; and
  a return fluid outlet adapted for communication with the source of heated fluid, all inlets and outlets also being in communication with the cavity provided within the valve body;
 an insert in a sealing relationship with an inner surface of the cavity, the insert maintaining a fixed position with the inner surface of the cavity and having a central bore and also defining flow passages and being configured to direct flows of fluid entering the cavity via the first fluid inlet and the second fluid inlet;
 a thermostatic element and a piston, wherein increase and decrease in the temperature of the fluid inside the cavity causes expansion and contraction respectively of the thermostatic element and this in turn causes movement of the piston within the cavity in one direction or in an opposing direction respectively; and
 the flow passages defined by the insert interact with the piston such that movement of the piston causes the flow passages to operate to selectively permit, restrict or prevent flows of fluid into or out of the cavity.

2. The fluid temperature regulating valve as claimed in claim 1, wherein the insert is a plastic shell.

3. The fluid temperature regulating valve as claimed in claim 1, wherein the insert is moulded over with a thermoplastic elastomer seal which enters into a sealing relationship with the inner surface of the cavity.

4. The fluid temperature regulating valve as claimed in claim 1, wherein the insert has at least one cutout or aperture communicating with the central bore of the insert.

5. The fluid temperature regulating valve as claimed in claim 1, wherein at least one moulded recess is provided on an outer surface of the insert.

6. The fluid temperature regulating valve as claimed in claim 1, wherein the central bore is offset with respect to the cavity of the valve body.

7. The fluid temperature regulating valve as claimed in claim 1, wherein the thermostatic element is mounted on the piston, and the piston can interact with an inner face of the insert and other parts of the valve.

8. The fluid temperature regulating valve according to claim 1, wherein the insert includes a sealing member that assists in restricting flows of fluid into or out of the cavity in response to engaging with the piston.

9. A multi-port fluid temperature regulating valve for use in a closed heating system, comprising:
a valve body having a first end that is open, an internal cavity wherein fluids are mixed to form a mixed fluid, a first inlet adapted to provide fluid communication between the internal cavity and a source of heated fluid, a first outlet adapted to provide fluid communication between the internal cavity and a heating apparatus that uses the mixed fluid for heating, a second inlet adapted to provide fluid communication between the internal cavity and the heating apparatus, and a second outlet adapted to provide fluid communication between the internal cavity and the source of heated fluid;
an insert in a sealing relationship with an inner surface of the cavity, the insert maintaining a fixed position with the inner surface of the cavity and having a first end, a second end, a central bore, a plurality of flow passages configured to direct the flow of fluids into the cavity through the first inlet and the second inlet and out of the cavity through the first outlet and the second outlet, and a sealing member mounted in the second end thereof;
a cap secured to the first end of the valve body, the cap having an opening therethrough;
a spindle rotatably mounted within the cap opening, the spindle having a first end and a second end wherein the second end of the spindle is extendable into the cavity of the valve body;
a rotatable control knob secured to the first end of the spindle, the control knob operable to rotate the spindle in a first direction such that the second end of the spindle is extended into the cavity of the valve body, the control knob further operable to rotate the spindle in a second direction such that the second end of the spindle is retracted from the cavity of the valve body;
a thermostatic element mounted within the insert, the thermostatic element having a housing with a thermal responsive material therein and a slidable piston rod extendable from the housing, wherein increase of the temperature of fluid inside the cavity causes expansion of the thermal responsive material, wherein decrease of the temperature of fluid inside the cavity causes contraction of the thermal responsive material, wherein the piston rod is operable to extend from the thermostatic element towards the second end of the spindle when the thermal responsive material expands, and wherein the piston rod is further operable to retract into the thermostatic element away from the second end of the spindle when the thermal responsive material contracts;
a spring operable to bias the thermostatic element towards the second end of the spindle; and
a piston that is tubular and slidably mounted within the insert, the piston connected to the housing of the thermostatic element for concomitant movement therewith, the piston operable to move between the cap and the sealing member of the insert;
wherein the flow passages of the insert interact with the piston such that movement of the piston causes the flow passages to operate to selectively permit, restrict or prevent the flow of fluid into the cavity through the first inlet and the second inlet.

10. The fluid temperature regulating valve according to claim 9, further comprising a locking ring between the cap and the control knob, the locking ring having a plurality of flexible projections operable to engage the spindle to prevent unintended rotation of the spindle.

11. The multi-port fluid temperature regulating valve according to claim 9, wherein the sealing member assists in restricting flows of fluid into the cavity in response to engaging with the piston.

12. The multi-port fluid temperature regulating valve according to claim 9, wherein a sealing surface between the insert and the inner surface of the cavity is tapered to improve the seal.

13. The multi-port fluid temperature regulating valve according to claim 9, further comprising a retainer operable to slide into the second end of the insert to engage the sealing member and thereby secure the sealing member within the insert, wherein the retainer is secured within the insert by a snap-fit connection.

14. The multi-port fluid temperature regulating valve according to claim 9, further comprising a thrust bearing member between the second end of the spindle and the piston rod to reduce wear on the second end of the spindle.

15. A four-port fluid temperature regulating valve for use in a closed hydronic heating system, comprising:
a valve body having a first end that is open and an opposing closed second end, an internal cavity wherein fluids are mixed to form a mixed fluid, a first inlet adapted to provide fluid communication between the internal cavity and a source of heated fluid, a first outlet adapted to provide fluid communication between the internal cavity and a heating apparatus that uses the mixed fluid for heating, a second inlet adapted to provide fluid communication between the internal cavity and the heating apparatus, and a second outlet adapted to provide fluid communication between the internal cavity and the source of heated fluid;
an insert in a sealing relationship with an inner surface of the cavity, the insert maintaining a fixed position with the inner surface of the cavity and having an open first end, an open second end, a central bore, and a plurality of flow passages configured to direct the flow of fluids into the cavity through the first inlet and the second inlet and out of the cavity through the first outlet and the second outlet, the insert having an O-ring sealing member mounted in the second end thereof, wherein a sealing surface between the insert and the inner surface of the cavity is tapered to improve the seal;
a retainer operable to slide into the open second end of the insert to engage the O-ring sealing member and thereby secure the O-ring sealing member within the insert, wherein the retainer is secured within the insert by a snap-fit connection;

a cap secured to the first end of the valve body, the cap having an opening therethrough;

a spindle rotatably mounted within the cap opening, the spindle having a first end and a second end wherein the second end of the spindle is extendable into the cavity of the valve body;

a rotatable control knob secured to the first end of the spindle, the control knob operable to rotate the spindle in a first direction such that the second end of the spindle is extended into the cavity of the valve body, the control knob further operable to rotate the spindle in a second direction such that the second end of the spindle is retracted from the cavity of the valve body;

a locking ring between the cap and the control knob, the locking ring having a plurality of flexible projections operable to engage the spindle to prevent unintended rotation of the spindle;

a thermostatic element mounted within the insert, the thermostatic element having a housing with a thermal responsive material therein and a slidable piston rod extendable from the housing, wherein increase of the temperature of fluid inside the cavity causes expansion of the thermal responsive material, wherein decrease of the temperature of fluid inside the cavity causes contraction of the thermal responsive material, wherein the piston rod is operable to extend from the thermostatic element towards the second end of the spindle when the thermal responsive material expands, and wherein the piston rod is further operable to retract into the thermostatic element away from the second end of the spindle when the thermal responsive material contracts;

a compression spring operable to engage the thermostatic element to bias the thermostatic element towards the second end of the spindle; and a piston that is tubular and slidably mounted within the insert, the piston secured to the housing of the thermostatic element for concomitant movement therewith, the piston operable to move between the cap and the O-ring sealing member of the insert;

wherein the flow passages of the insert interact with the piston such that movement of the piston causes the flow passages to operate to selectively permit, restrict or prevent the flow of fluid into the cavity through the first inlet and the second inlet.

16. The four-port fluid temperature regulating valve according to claim 15, wherein the cap and the O-ring sealing member assist in restricting flows of fluid into the cavity in response to engaging with the piston.

17. The four-port fluid temperature regulating valve according to claim 15, further comprising a thrust bearing member between the second end of the spindle and the piston rod to reduce wear on the second end of the spindle.

* * * * *